United States Patent
Heap et al.

(10) Patent No.: US 8,260,511 B2
(45) Date of Patent: Sep. 4, 2012

(54) METHOD FOR STABILIZATION OF MODE AND FIXED GEAR FOR A HYBRID POWERTRAIN SYSTEM

(75) Inventors: Anthony H. Heap, Ann Arbor, MI (US); Kee Yong Kim, Ann Arbor, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 930 days.

(21) Appl. No.: 12/234,642

(22) Filed: Sep. 20, 2008

(65) Prior Publication Data

US 2009/0118921 A1 May 7, 2009

Related U.S. Application Data

(60) Provisional application No. 60/985,229, filed on Nov. 3, 2007.

(51) Int. Cl.
*G06F 7/00* (2006.01)
(52) U.S. Cl. .......................................................... 701/54
(58) Field of Classification Search .................... 701/22, 701/51, 54, 55; 477/107, 119; 180/65.21
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 7,228,926 B2 * | 6/2007 | Takami et al. ........... 180/65.265 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |

(Continued)

*Primary Examiner* — Kim T Nguyen (57) ABSTRACT

A powertrain system includes an engine mechanically coupled to an electro-mechanical transmission selectively operative in one of a plurality of transmission operating range states and one of a plurality of engine states. A method for controlling the powertrain system includes determining a current transmission operating range state and a current engine state, determining at least one potential transmission operating range state and engine state, determining preferability factors associated with the current and potential transmission operating range state and the engine state, preferentially weighting the preferability factors for the current transmission operating range state and engine state, and selectively commanding changing the present transmission operating range state and engine state based upon the preferability factors.

15 Claims, 5 Drawing Sheets

U.S. PATENT DOCUMENTS

| | | |
|---|---|---|
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0202987 A1 | 8/2007 | Kakinami et al. |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0076691 A1* | 3/2009 | Burke et al. .................. 701/54 |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |

| | | | | | |
|---|---|---|---|---|---|
| 2009/0118938 A1 | 5/2009 | Heap | 2009/0118951 A1 | 5/2009 | Heap |
| 2009/0118939 A1 | 5/2009 | Heap | 2009/0118952 A1 | 5/2009 | Heap |
| 2009/0118940 A1 | 5/2009 | Heap | 2009/0118954 A1 | 5/2009 | Wu |
| 2009/0118941 A1 | 5/2009 | Heap | 2009/0118957 A1 | 5/2009 | Heap |
| 2009/0118942 A1 | 5/2009 | Hsieh | 2009/0118962 A1 | 5/2009 | Heap |
| 2009/0118943 A1 | 5/2009 | Heap | 2009/0118963 A1 | 5/2009 | Heap |
| 2009/0118944 A1 | 5/2009 | Heap | 2009/0118964 A1 | 5/2009 | Snyder |
| 2009/0118945 A1 | 5/2009 | Heap | 2009/0118969 A1 | 5/2009 | Heap |
| 2009/0118946 A1 | 5/2009 | Heap | 2009/0118971 A1 | 5/2009 | Heap |
| 2009/0118947 A1 | 5/2009 | Heap | 2009/0118999 A1 | 5/2009 | Heap |
| 2009/0118948 A1* | 5/2009 | Heap et al. .................. 701/55 | 2009/0144002 A1 | 6/2009 | Zettel |
| 2009/0118949 A1 | 5/2009 | Heap | | | |
| 2009/0118950 A1 | 5/2009 | Heap | | | |

* cited by examiner

METHOD FOR STABILIZATION OF MODE AND FIXED GEAR FOR A HYBRID POWERTRAIN SYSTEM

CROSS-REFERENCES TO RELATED APPLICATIONS

This application claims the benefit of U.S. Provisional Application No. 60/985,229 filed on Nov. 3, 2007, which is hereby incorporated herein by reference.

TECHNICAL FIELD

This disclosure relates generally to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes an engine mechanically coupled to an electro-mechanical transmission selectively operative in one of a plurality of transmission operating range states and one of a plurality of engine states. A method for controlling the powertrain system includes determining a current transmission operating range state and a current engine state, determining at least one potential transmission operating range state and engine state, determining preferability factors associated with the current and potential transmission operating range state and the engine state, preferentially weighting the preferability factors for the current transmission operating range state and engine state, and selectively commanding changing the present transmission operating range state and engine state based upon the preferability factors.

BRIEF DESCRIPTION OF THE DRAWINGS

One or more embodiments will now be described, by way of example, with reference to the accompanying drawings, in which.

DETAILED DESCRIPTION

Figure 1:
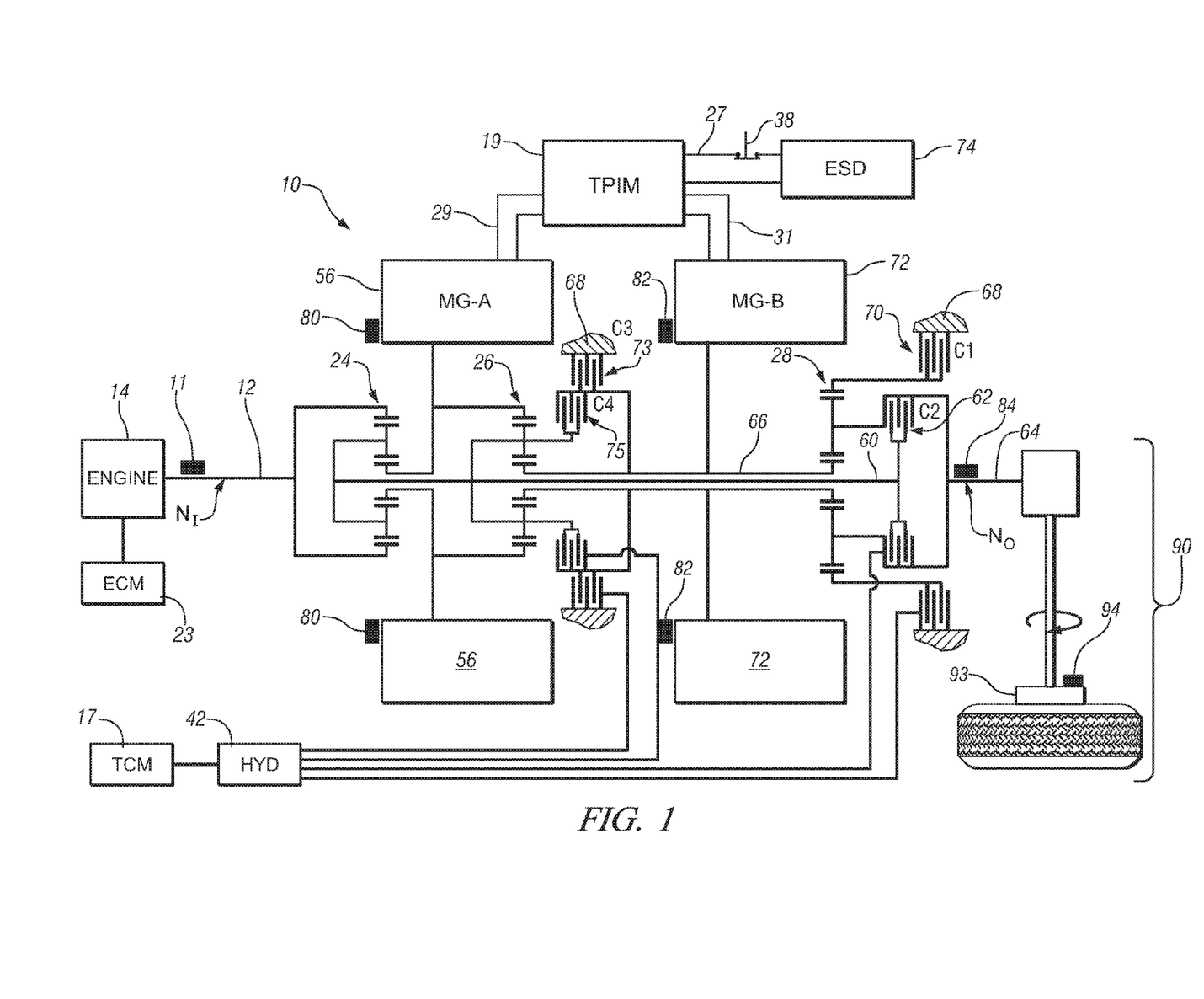
FIG. 1 is a schematic diagram of an exemplary powertrain, in accordance with the present disclosure.

Referring now to the drawings, wherein the showings are for the purpose of illustrating certain exemplary embodiments only and not for the purpose of limiting the same, FIG. 1 shows an exemplary electro-mechanical hybrid powertrain. The exemplary electro-mechanical hybrid powertrain shown in FIG. 1 comprises a two-mode, compound-split, electro-mechanical hybrid transmission 10 operatively connected to an engine 14, and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

In one embodiment, the exemplary engine 14 comprises a multi-cylinder internal combustion engine which is selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 is preferably present to monitor rotational speed of the input shaft 12. Power output from the engine 14, comprising rotational speed and output torque, can differ from the input speed, $N_I$, and the input torque, $T_I$, to the transmission 10 due to torque-consuming components being present on or in operative mechanical contact with the input shaft 12 between the engine 14 and the transmission 10, e.g., a hydraulic pump (not shown) and/or a torque management device (not shown).

In one embodiment the exemplary transmission 10 comprises three planetary-gear sets 24, 26 and 28, and four selectively-engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. In one embodiment, clutches C2 62 and C4 75 preferably comprise hydraulically-applied rotating friction clutches. In one embodiment, clutches C1 70 and C3 73 preferably comprise hydraulically-controlled stationary devices that can be selectively grounded to a transmission case 68.

In a preferred embodiment, each of the clutches C1 70, C2 62, C3 73, and C4 75 is preferably hydraulically applied, selectively receiving pressurized hydraulic fluid via the hydraulic control circuit 42.

In one embodiment, the first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with commands provided to the TPIM which derive from such factors as including operator torque requests, current operating conditions and states, and such commands determine whether the ESD 74 is being charged, discharged or is in stasis at any given instant.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31, depending on commands received which are typically based on factors which include current operating state and operator torque demand.

Figure 2:
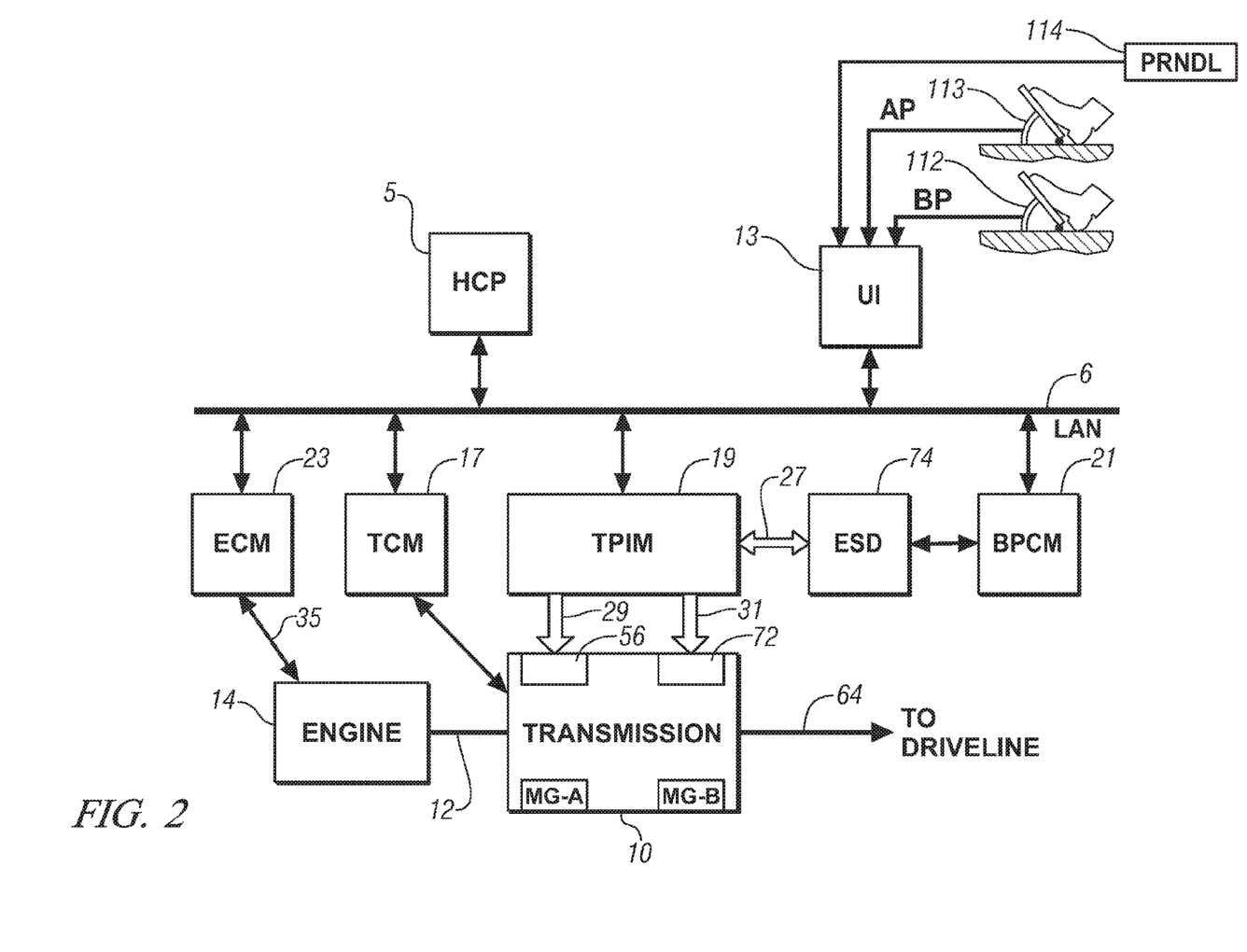
FIG. 2 is a schematic diagram of an exemplary architecture for a control system and powertrain, in accordance with the present disclosure.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator may selectively control or direct operation of the electro-mechanical hybrid powertrain. The devices present in UI 13 typically include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters which may include without limitation: a manifold pressure, engine coolant temperature, throttle position, ambient air temperature, and ambient pressure. The engine load can be determined, for example, from the manifold pressure, or alternatively, from monitoring operator input to the accelerator pedal 113. The ECM 23 generates and communicates command signals to control engine actuators, which may include without limitation actuators such as: fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are preferably executed at regular intervals, for example at each 3.125, 6.25, 12.5, 25 and 100 milliseconds during ongoing operation of the powertrain. However, any interval between about 2 milliseconds and about 300 milliseconds may be selected. Alternatively, algorithms may be executed in response to the occurrence of any selected event.

The exemplary powertrain shown in reference to FIG. 1 is capable of selectively operating in any of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. As an example, a first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode II, or MII, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. For example, a first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Resultant vehicle acceleration is affected by other factors including, e.g., road load, road grade, and vehicle mass. The operating range state is determined for the transmission 10 based upon inputs which include a variety of operating characteristics of the powertrain. These include the operator torque request communicated through the accelerator pedal 113 and brake pedal 112 to the user interface 13

In some embodiments, the operating range state may be predicated on a powertrain torque demand caused by a command to operate the first and second electric machines 56 and 72 in an electrical energy generating mode or in a torque generating mode. In some embodiments, the operating range state can be determined by an optimization algorithm or routine which determines a preferential selection of the operating range state based upon inputs which may include: operator demand for power; battery state-of-charge; and operating efficiencies of the engine 14 and the first and second electric machines 56, 72. The control system manages torque inputs from the engine 14 and the first and second electric machines 56 and 72 based upon pre-selected outcome criteria embedded in the executed selection routine, and system operation is controlled thereby to effectively manage resources commensurate with desired levels of ESD state-of-charge and fuel delivery. Moreover, operation can be determined, including over-riding of any desired feature(s), based upon detection of a fault in one or more components or sub-systems. The HCP 5 monitors the torque-generative devices, and determines the power output from the transmission 10 required to achieve the output torque necessary to meet the operator torque request. The ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Given various operating conditions possible for a motorized vehicle equipped with an electro-mechanical hybrid transmission, which include varied environmental and road conditions such as road grade and operator torque demands, it is generally possible for an electro-mechanical hybrid transmission to be usefully operatively engaged potentially in more than one transmission operating range state, including such range states specified in Table I, at a given time during its operation. Moreover, it may be true that for every change in road grade, throttle opening, and brake pedal depression that a motorized vehicle comprising an electro-mechanical hybrid transmission experiences during the course of its typical travel, differing transmission operating range state and engine states of the engine may at any time be viewed as being advantageous in consideration of an overall balance between such factors including fuel economy, required torque output of the transmission, and state-of-charge of the ESD 74. At any one instant in time, a particular transmission operating range state and engine state may be desirable, advantageous or preferred, while at subsequent instants in time other transmission operating range state and engine states may be desirable, advantageous or preferred, with the result being that over even a relatively short time span of operation such as, for example, five minutes, conditions making dozens or more desirable, advantageous, or preferred transmission operating range state and engine states exist during such time span. However, this disclosure provides that altering the transmission operating range state and engine state in response to each and every single change in operating conditions encountered is not necessarily desirable in a motorized vehicle having an electro-mechanical hybrid transmission.

Figure 3:
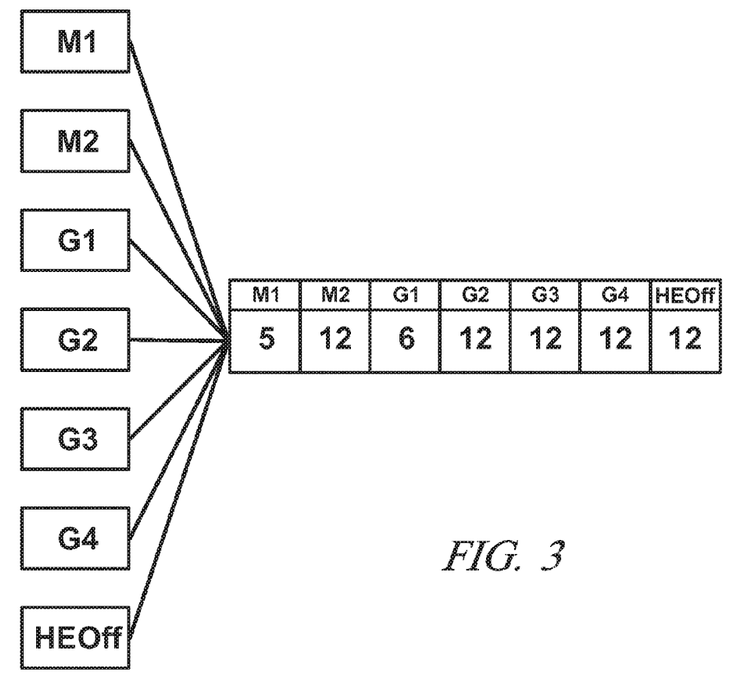
FIG. 3 shows an arrangement of a first plurality of preferability factors relating to a method, in accordance with the present disclosure.

According to one embodiment of this disclosure, FIG. 3 shows a first plurality of numerical values, each of which represents a preferability factor for each of the potential operating range states of an electro-mechanical hybrid transmission, and potential engine states for the engine, including the operating range states and engine states specified in Table I. In FIG. 3, the designations M1 and M2 refer to mode 1 and mode 2 of the electro-mechanical hybrid transmission. The designations G1, G2, G3, and G4 refer to gear 1, gear 2, gear 3, and gear 4, respectively, and HEOff refers to the engine state, which engine state is either engine-on or engine-off. In one embodiment of this disclosure, any one or more such preferability factors may be arbitrarily assigned. In another embodiment, any one or more of such preferability factors may comprise an output generated as a result of any algorithmic or other data processing method which has as an input or basis any information provided by any one or more sensors disposed at any location on a motorized vehicle equipped with such an electro-mechanical hybrid transmission, or disposed on, at, or near any portion of its drive train where data may be acquired. Such sensors may include without limitation: a wheel speed sensor 94, an output speed sensor 84, and a rotational speed sensor 11.

It is desired that the preferability factors provided for each of the transmission operating range states and engine state shown in FIG. 3 are maintained in association with their respective transmission operating range state and engine state, and according to one embodiment of this disclosure such preferability factors are set forth in an array, as shown in FIG. 3. This arrangement is not a strict requirement, but is of convenience when performing a method according to this disclosure, as shown and described in relation to FIG. 4.

This disclosure also provides a plurality of numerical values, each of which is associated with one of the possible operating range states and engine states of an electro-mechanical hybrid transmission at any selected point in time while in service in a motorized vehicle, such as during operation while a vehicle is traveling on a road surface, which plurality may be referred to as current operating range state values. Preferred embodiments include a numerical value associated with the vehicle engine state. This second plurality of numerical values are shown arranged in an array in FIG. 4 labeled as "current operating range factors" which includes numerical values for both the transmission operating range state and the engine state.

Figure 4:
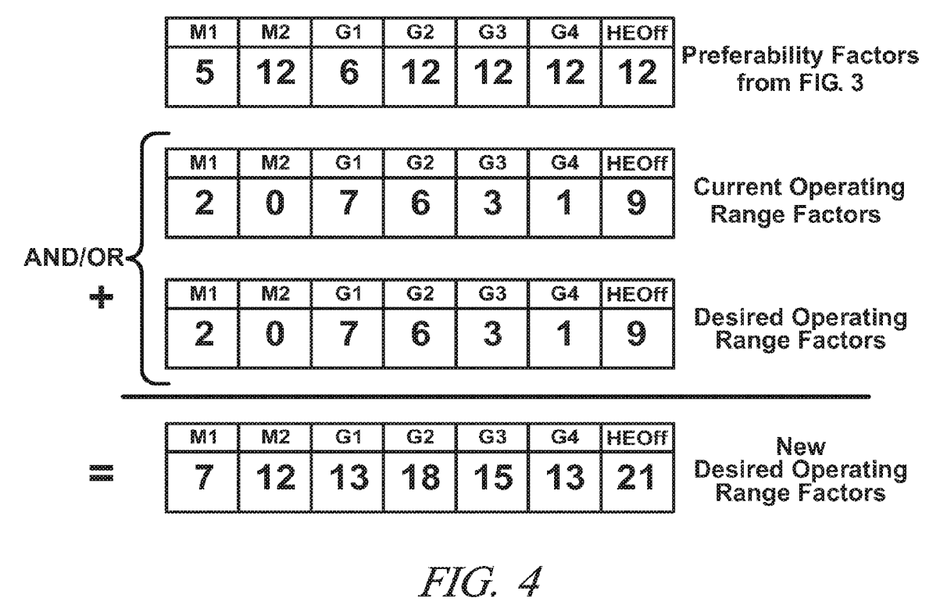
FIG. 4 illustrates a combination of a plurality of preferability factors in accordance with the present disclosure.

FIG. 4 illustrates how the numerical values of the first plurality of preferability factors from FIG. 3 may be combined with the second plurality of preferability factors from the current operating range state and engine state. In one embodiment, the combination is made by summing the numerical values from each corresponding operating range state and engine state in each array, to arrive at a third array that comprises preferability factors for each possible transmission operating range state and engine state, which is labeled "new desired operating range factors". As used herein, a desired operating range state refers to a transmission operating range state or engine state that is, for one reason or another, generally relating to drivability, but may relate to engine economy, emissions or battery life, more desirable than the current transmission operating range state and/or engine state. The numerical values present in the third array may be compared to one another, and in one embodiment the lowest numerical value present in the third array represents the transmission operating range state or engine state which is to be selected or evaluated for selection as a basis upon which to make a change in operating state of the electro-mechanical hybrid transmission while a motorized vehicle containing same is in operation. For example, in the third array in FIG. 4, the lowest numerical value is 7, corresponding to mode 1 operation of the electro-mechanical hybrid transmission, whereas the current operating range state for the vehicle transmission is mode 2, evidenced by the zero in the current operating range array being the lowest numerical value. In one illustrative, non-limiting exemplary embodiment, a signal would be sent to a shift execution module embedded in the TCM 17, suggesting a change of transmission operating range state from mode 2 to mode 1, which may be effected by the TCM. In alternate embodiments, the TCM may be provided with additional decision-making data and algorithms to either accept and execute a suggested command change resulting from a process according to this disclosure, or it may deny such execution, based on other factors programmed into the TCM 17 which can be arbitrary in one embodiment, and in other embodiments are based on the output of one or more algorithms having inputs provided by on-board vehicle sensors. In one embodiment of the disclosure, the TCM 17 provides current operating range factors, which may be in the same format that the numerical values for the second plurality of preferability factors are in. In other embodiments, the TCM 17 provides current operating range factors in any format different than that which the numerical values relating to the second plurality of preferability factors are in.

In another embodiment, the first plurality of preferability factors described in reference to FIG. 3 may be combined with an alternative plurality of preferability factors, which are depicted in the array labeled as the "desired operating range factors" (which include numerical values for both the transmission operating range state and the engine state) in FIG. 4, to arrive at a third array comprising a set of preferability factors which are considered the "new desired operating range factors". The preferability factors comprising the desired operating range factors may be an output generated as a result of any algorithm or other data processing method of information provided by any one or more sensors disposed at any location on a motorized vehicle equipped with such an electro-mechanical hybrid transmission, or disposed on, at, or near any portion of its drive train where data may be acquired. Such sensors include without limitation: a wheel speed sensor 94, an output speed sensor 84, and a rotational speed sensor 11. In another embodiment, the first plurality of preferability factors described in reference to FIG. 3 may be combined with both the preferability factors from the current operating range factors and the desired operating range factors to arrive at a third array comprising new desired operating range factors.

In general, one or more of the preferability factors among the desired operating range factors will change over time, in response to changing operating conditions encountered by a motorized vehicle equipped with an electro-mechanical hybrid transmission, and the value of these factors may either increase or decrease during vehicle operation. For example, when an operator makes a torque request upon encountering an uphill grade while traveling at a low speed, the preferability factor associated with gear 1 operation may be caused to decrease in value in response thereto. Similarly, when the vehicle operator makes a braking torque request upon encountering an downhill grade while traveling at a constant speed, the preferability factor associated with gear 1 operation may be caused to increase substantially in value so that selection of the gear 1 operating range is essentially precluded.

In FIG. 4, the numerical values in the arrays comprising the current operating range factors and the desired operating range factors are identical only for illustrative purposes, and in practice the numerical values present in these sets of preferability factors may differ from one another. For embodiments in which the first plurality of preferability factors from FIG. 3 are combined with those of the desired operating range factors, a third array comprising preferability factors for a new desired operating range factors are provided, at least one of which factors are subsequently provided to a shift control module which may be embedded in the TCM 17. For instances in which the shift control module orders the execution of a change in transmission operating range state, engine state, or both, the preferability factors comprising the new desired operating range factors are communicated as an input to a process of this disclosure as the desired operating range factors in a subsequent iteration of a process as herein described, as it is desirable in such embodiments to repeatedly perform a method as described herein at any time interval desired or selected, which may be any interval between about 2 milliseconds and about 300 milliseconds, including all intervals and ranges of intervals therebetween.

In preferred combinations of preferability factors according to the disclosure, it is desirable to only combine preferability factors of like kind with one another, i.e., preferability factors relating to M1 may only be combined with other preferability factors which relate to M1, G2 with G2, and so forth. Although combination of arrays, each of which comprise a plurality of preferability factors according to one embodiment of this disclosure has been shown and described as involving the summation of such arrays, and selecting the least value present in an array as a value for consideration in making a change in the operating range of an electro-mechanical hybrid transmission, the present disclosure also includes embodiments in which the selection criteria is to choose the largest numerical value. In other embodiments, the combination of two or more arrays may include subtraction, division, or multiplication of the numerical values corresponding to each operating range present in the arrays so combined, to provide that one of the values emerges as unique or differentiable from the remaining values present as a result of such combination, each value representing a relative preferability of the engine state or transmission range state. Selection is then made basis the highest or lowest numerical value present, or any other differentiable numerical attribute, in each of such embodiments. For cases where two or more preferability factors present in a set or array which results from a combination of preferability factors as provided herein are identical or non-differentiable from one another, the selection of a transmission operating range from such non-differentiable values may be arbitrary, or may be set to any default selection desired.

In one embodiment of the disclosure, the numerical values of the first plurality of preferability factors in the array shown in FIG. 3 may be selected to be of a size sufficient to provide a biasing effect when combined with numerical values present in either the desired operating range factors or current operating range factors as described in reference to FIG. 4. For convenience according to one embodiment, sets of such preferability factors from FIG. 3 may be provided and arranged in a matrix, as shown in Table II and Table III below:

TABLE II

Bias offset matrix for stabilization of current operating range

| | | Desired Range | | | | | | |
|---|---|---|---|---|---|---|---|---|
| | | M1 | M2 | G1 | G2 | G3 | G4 | HEOff |
| Current | M1 | 0 | 0.5 | A | 0.5 | 0.5 | 0.5 | 0.5 |
| Range | M2 | 0.5 | 0 | 0.1 | 0.1 | 0.2 | 0.5 | 0.2 |
| | G1 | 0.5 | 0.5 | 0 | 0.5 | 0.3 | 0.5 | 0.5 |
| | G2 | 0.3 | 0.1 | 0.5 | 0 | 0.5 | 0.3 | 0.2 |
| | G3 | 0.5 | 0.2 | 0.3 | 0.5 | 0 | 0.5 | 0.5 |
| | G4 | 0.5 | 0.5 | 0.5 | 0.2 | 0.5 | 0 | 0.5 |
| | HEOff | 0.5 | 0.5 | 0.5 | 0.5 | 0.5 | 0.5 | 0 |

Thus, a plurality of preferability factors for the current operating range factors may be provided from such matrix. Under such an arrangement, if the current operating range of the electro-mechanical hybrid transmission is mode 1, then numerical values from the first row are chosen as the numerical values for the array to be used in a combination of arrays as described herein. Arrays for the desired operating range factors may be selected from a matrix such as that shown in Table III, as representative of preferability factor values associated with the desired operating range state of the electro-mechanical hybrid transmission and engine state.

TABLE III

Bias offset matrix for stabilization of previously selected desired operating range

| | | Desired Range | | | | | | |
|---|---|---|---|---|---|---|---|---|
| | | M1 | M2 | G1 | G2 | G3 | G4 | HEOff |
| Previously | M1 | 0 | 0.5 | B | 0.5 | 0.5 | 0.5 | 0.5 |
| Selected | M2 | 0.5 | 0 | 0.1 | 0.1 | 0.2 | 0.5 | 0.2 |
| Desired | G1 | 0.5 | 0.5 | 0 | 0.5 | 0.3 | 0.5 | 0.5 |
| Range | G2 | 0.3 | 0.1 | 0.5 | 0 | 0.5 | 0.3 | 0.2 |
| | G3 | 0.5 | 0.2 | 0.3 | 0.5 | 0 | 0.5 | 0.5 |
| | G4 | 0.5 | 0.5 | 0.5 | 0.2 | 0.5 | 0 | 0.5 |
| | HEOff | 0.5 | 0.5 | 0.5 | 0.5 | 0.5 | 0.5 | 0 |

When combining arrays comprising current operating range factors and desirable operating range factors described in reference to FIG. 4 with a plurality of preferability factors as provided in reference to FIG. 3 according to this disclosure, the net effect is to stabilize the shifting of the transmission to both the desired operating range and the current operating range by inclusion of the preferability factors provided according to FIG. 3. Through judicious selection of the values in Tables II and III above, an unexpected benefit arises in that it is possible to select values which prohibit specific changes in operating range states of an electro-mechanical hybrid transmission. For example, a change in operating range from mode 2 to gear 4 may be permitted, whereas a change in operating range from mode 2 to gear 3 may be forbidden, the choices of which changes to permit or forbid being in control of the user of a method herein by their judicious selection of numerical values for the preferability factors. In general, it is desirable to avoid selecting non-allowed range states, whether based on output speed of the transmission or any other criteria selected by a user. In one embodiment, different potential input speeds for mode 1 and mode 2 operation of the transmission are considered over time in providing corresponding numerical values for these states in the first plurality of numerical values, independent of the desired transmission operating range state. According to one embodiment, a selection process involves consideration only of the input speed associated with the desired transmission operating state selected. In one preferred embodiment, the numerical value representative of the current transmission operating range state has a bias of zero. In other embodiments, the numerical value representative of the current transmission operating range state has a relatively small bias, and may be either positive or negative. Although shown as positive numerical values, a preferability factor according to the disclosure may be negative, since the net result of a process herein which combines the different preferability factors for the result specified depends generally on their relative magnitudes with respect to one another.

Figure 5A:
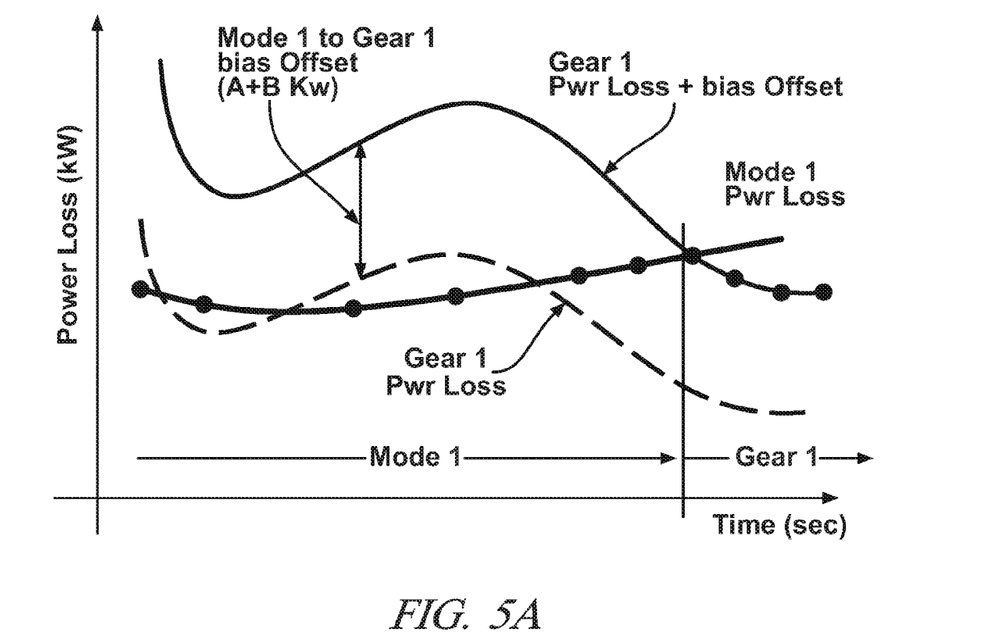
FIG. 5A provides a graphical representation of a stabilization of changes of operating range of an electro-mechanical hybrid transmission, in accordance with the present disclosure.
Figure 5B:
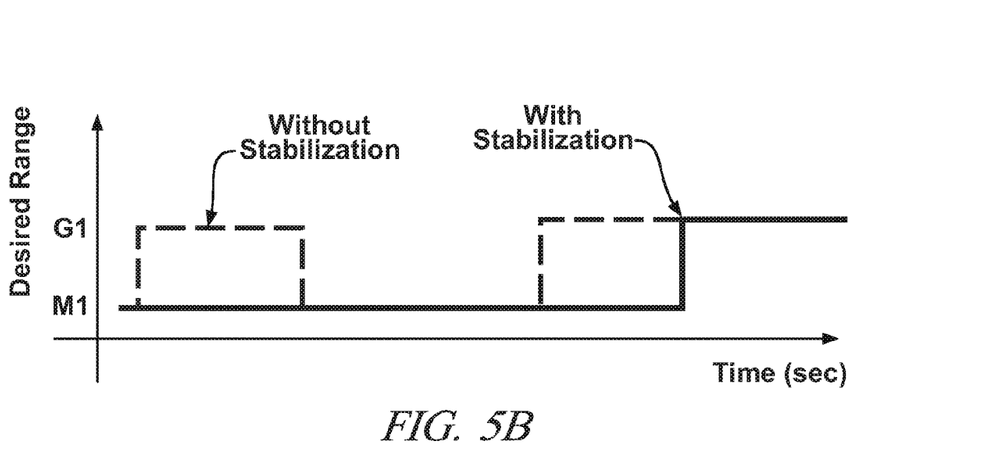
FIG. 5B shows an alternate graphical representation of a stabilization of changes of operating range of an electro-mechanical hybrid transmission, in accordance with the present disclosure.

The net effect of the stabilization of shifting events or changes of operating range of an electro-mechanical hybrid transmission according to this disclosure is illustrated in FIG. 5A, which uses power loss as its ordinate; however, other units of ordinate may be employed as desired. In FIG. 5A the power loss associated with vehicle operation in gear 1 over time of varying operating conditions is shown by the dotted wavy line. As this power loss varies along the abscissa of time labeled as mode 1, it may be possible for other operating range states of the electro-mechanical hybrid transmission to be employed to advantage with respect to fuel economy, battery state-of-charge, total torque output, etc. However, given typical wide variance in torque demands over time by an operator, a plurality of shifting or transmission mode changes would adversely impact drivability of a vehicle so equipped. Hence, by the present incorporation of bias, by consideration of the preferability factors described, the power loss associated with vehicle operation in gear 1 over time of varying operating conditions may be moved upwards on the ordinate scale, to the corresponding solid wavy line, the amount of which bias is represented by the sum of factors A and B from the first row in Table II and Table III respectively. The result of this with reference to FIG. 5A is that the transmission operating range remains in mode 1 until the power loss associated with operating in that mode, plus the bias amount, exceeds the power loss of operating in another operating range state, in this case gear 1, at which point a change in operating range state is effected, with the power loss throughout the depicted time interval following the path marked by solid circles. Accordingly, situations where excessive operating range state changes of an electro-mechanical hybrid transmission occur, are maintained at any desirable level, dictated by the preferability factors chosen, which can mean their minimization, as well as substantial or complete elimination. This result is also depicted in FIG. 5B, which shows the transmission desired operating range state as ordinate, depicting the removal of what would have been deemed as an undesirable operating range state change for some enduse applications of a vehicle equipped with an electro-mechanical hybrid transmission according to the disclosure.

In one embodiment, the matrices, arrays, or other arrangements of preferability factors as described herein are caused to be present in or accessible to a microprocessor, in hard or soft memory, and the combinations described herein are preferably carried out using such a processing device, which then issues an output to a TCM 17 that itself employs such output as an input in its own decision-making process. However, any arrangement of the preferability factors in memory which is convenient for computing purposes may be employed, in addition to such matrices or arrays as herein described. Individual preferability factors may relate to, or be based upon any number of potential variables relating to vehicle operation, and include without limitation variables relating to energy usage, drivability, fuel economy, tailpipe emissions, and battery state-of-charge, with information concerning such variables being provided in one embodiment, by sensors. In other embodiments, the preferability factors may be derived from or based on losses in a vehicle entire mechanical drive system, including losses due to belts, pulleys, valves, chains, losses in the electrical system, heat losses, electrical machine power losses, internal battery power loses, or any other parasitic loss in a vehicle system, taken either alone, or in combination with any one or more other loss or losses.

Figure 6:
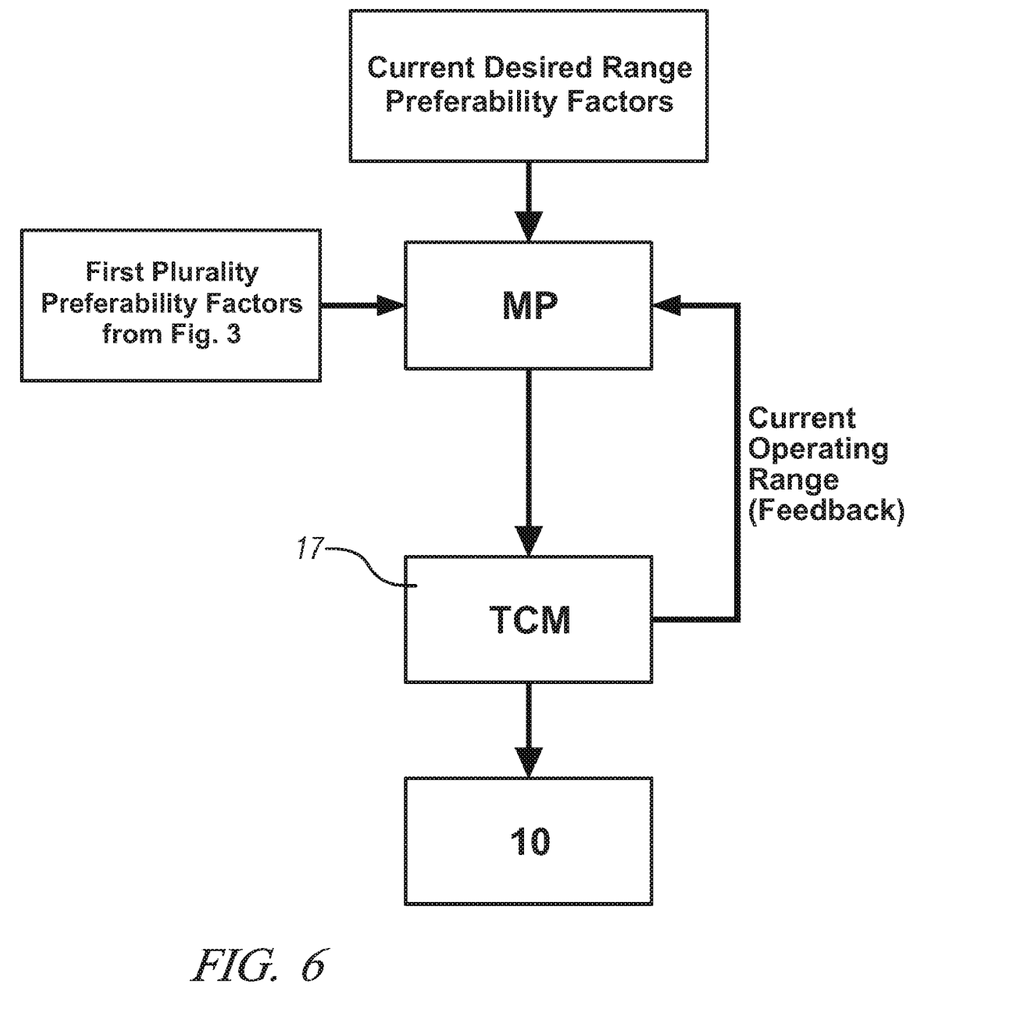
FIG. 6 depicts an architecture useful in carrying out execution of a change of operating range of an electro-mechanical hybrid transmission, in accordance with the present disclosure.

FIG. 6 depicts an architecture including a microprocessor, which is capable of carrying out execution of a change of operating range state of an electro-mechanical hybrid transmission according to one embodiment of the disclosure. FIG. 6 shows microprocessor MP, having inputs of the current desired range preferability factors, and the preferability factors described in reference to FIG. 3. The microprocessor has an output, which is inputted to a transmission control module, TCM 17, which itself provides feedback to the microprocessor in the form of a plurality of current operating range state preferability factors. The TCM 17 is capable of providing a suggested shift execution command to the transmission 10.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain system including an engine mechanically coupled to an electro-mechanical transmission selectively operative in one of a plurality of transmission operating range states and one of a plurality of engine states, wherein a control module performs method comprising:
  determining a current transmission operating range state and engine state;
  determining at least one potential transmission operating range state and engine state;
  determining preferability factors associated with the current transmission operating range state and engine state, and potential transmission operating range states and engine states;
  preferentially weighting the preferability factors for the current transmission operating range state and engine state; and
  selectively commanding changing the current transmission operating range state and engine state based upon said preferability factors.

2. A method according to claim 1 wherein said preferability factors associated with the potential transmission operating range states and engine states include new desired preferability factors associated with transmission operating range states and engine states.

3. A method according to claim 2 wherein selectively commanding changing the current transmission operating range state and engine state occurs as the result of selection of the lowest numerical value present in said new desired preferability factors.

4. A method according to claim 2 wherein selectively commanding changing the current transmission operating range state and engine state occurs as the result of selection of the highest numerical value present in said new desired preferability factors associated with transmission operating range states and engine states.

5. A method according to claim 2 wherein one of the preferability factors present in the new desired preferability factors is used in providing information to a shift execution module.

6. A method according to claim 5, further comprising periodically repeating the method of claim 1 to provide successive iterations.

7. A method according to claim 6 wherein said shift execution module provides numerical values for the current transmission operating range states and engine states in successive iterations.

8. A method according to claim 1, further comprising periodically repeating the method of claim 1 to provide successive iterations.

9. A method according to claim 8, wherein determining preferability factors associated with the current transmission operating range state and engine state utilizes new desired preferability factors associated with transmission operating range states and engine states from a previous iteration.

10. A method according to claim 1 wherein said preferability factors are arranged in an array.

11. A method according to claim 1 wherein said preferability factors are selected from a matrix.

12. A method according to claim 1 wherein at least one numerical value present in said preferability factors associated with said current transmission operating range state and engine state and said potential transmission operating range states and engine states change over time in response to a changing vehicle operating condition.

13. A method according to claim 1 wherein determining preferability factors includes combining the preferability factors associated with said current transmission operating range state and engine state, and the preferability factors associated with the desired transmission operating range state and engine state.

14. A method according to claim 1 wherein said preferability factors are sets of preferability factors, which include one preferability factor for every possible transmission operating range state.

15. A method according to claim 1, wherein said preferability factors are selected so that said transmission operates at any efficiency level in the range of between about 60% and about 95%, including all percentages and ranges of percentages therebetween, as determined on the basis of power into said transmission versus power out of the transmission.

* * * * *